(12) United States Patent
Chen (10) Patent No.: US 12,535,672 B2
(45) Date of Patent: Jan. 27, 2026

(54) ELECTROWETTING DISPLAY PANEL AND ELECTROWETTING DISPLAY DEVICE

(71) Applicant: TCL China Star Optoelectronics Technology Co., Ltd., Guangdong (CN)

(72) Inventor: Yanling Chen, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/769,731

(22) PCT Filed: Apr. 1, 2022

(86) PCT No.: PCT/CN2022/084744
§ 371 (c)(1),
(2) Date: Apr. 16, 2022

(87) PCT Pub. No.: WO2023/173510
PCT Pub. Date: Sep. 21, 2023

(65) Prior Publication Data
US 2025/0013033 A1    Jan. 9, 2025

(30) Foreign Application Priority Data
Mar. 16, 2022   (CN) .................... 202210261685.X (51) Int. Cl.
*G02B 26/00*    (2006.01)
*F21V 8/00*    (2006.01)

(52) U.S. Cl.
CPC ......... *G02B 26/005* (2013.01); *G02B 6/0065* (2013.01)

(58) Field of Classification Search
CPC ................ G02B 26/005; G02B 6/3538; G02B 2207/115; G02B 5/1866; G02B 1/045; G02B 6/3596; G02B 26/00
See application file for complete search history.

(56) References Cited

U.S. PATENT DOCUMENTS

2007/0031097 A1 * 2/2007 Heikenfeld ............ G02B 26/02
362/600

FOREIGN PATENT DOCUMENTS

| CN | 106292124 A |   | 1/2017 |           |
|----|-------------|---|--------|-----------|
| CN | 106597658 A |   | 4/2017 |           |
| CN | 107129512   | * | 9/2017 | C09K 11/06|
| CN | 107735428 A |   | 2/2018 |           |
| CN | 108051915 A |   | 5/2018 |           |
| CN | 108565345 A |   | 9/2018 |           |
| CN | 109946251   | * | 6/2019 | G01N 21/31|
| CN | 110007557 A |   | 7/2019 |           |

(Continued)

OTHER PUBLICATIONS

Polymers vol. 10 Issue 4 Selenide-Containing Polyimides with an Ultrahigh Intrinsic Refractive Index Qilong Li etc.

*Primary Examiner* — Brandi N Thomas
(74) *Attorney, Agent, or Firm* — Nathan & Associates Patent Agents Ltd.; Menachem Nathan (57) ABSTRACT

An electrowetting display panel and an electrowetting display device are provided. The electrowetting display panel includes a waveguide layer, a first electrode layer, a light exit control layer, a second electrode layer, and a first substrate arranged in sequence. A material of the waveguide layer includes a selenium-containing heterocyclic polymer. The present application enhances a stability of transmission of light beams in the waveguide layer.

19 Claims, 5 Drawing Sheets

(56) References Cited

FOREIGN PATENT DOCUMENTS

CN 110391342 A 10/2019
JP 2004199935 A 7/2004

* cited by examiner

ELECTROWETTING DISPLAY PANEL AND ELECTROWETTING DISPLAY DEVICE

FIELD

The present disclosure relates to the field of display technologies, and more particularly, to an electrowetting display panel and an electrowetting display device.

BACKGROUND

Electrowetting display technology is a display technology that utilizes a principle of electrowetting to display images. Since electrowetting display technology can control transmission and reflection of incident light with high selectivity, a high contrast and a high image quality display effect can be achieved.

A display principle of the electrowetting display technology is: changing a voltage between a liquid and an insulating substrate to change a wettability of the liquid on the insulating substrate (i.e., changing a contact angle), so that the liquid can cover a waveguide layer under the insulating substrate to different extents, and couples out a set amount of light from the waveguide layer to achieve a grayscale display. However, in conventional electrowetting display products, due to a low refractive index of the waveguide layer, light beams cannot be stably transmitted in the waveguide layer, thereby reducing an image display effect of the electrowetting display products.

SUMMARY

The present application provides an electrowetting display panel and an electrowetting display device to solve a technical problem of light beams in a conventional electrowetting display panel being unable to stably transmit in a waveguide layer.

The present application provides an electrowetting display panel including:

a waveguide layer;

a first electrode layer disposed on a side of the waveguide layer;

a light exit control layer disposed on a side of the first electrode layer away from the waveguide layer;

a second electrode layer disposed on a side of the light exit control layer away from the first electrode layer; and a first substrate disposed on a side of the second electrode layer away from the light exit control layer.

A material of the waveguide layer includes a selenium-containing heterocyclic polymer.

Optionally, a refractive index of the waveguide layer ranges from 1.6 to 2.0.

Optionally, a transmittance of the waveguide layer is greater than or equal to 90%.

Optionally, a thermal decomposition temperature of the selenium-containing heterocyclic polymer is greater than 250° C.

Optionally, the selenium-containing heterocyclic polymer is a selenium-containing aliphatic heterocyclic 1,3 oxelene alkane polymer.

Optionally, the selenium-containing aliphatic heterocyclic 1,3 oxelene alkane polymer is -continued Optionally, the material of the waveguide layer further includes a plurality of nanoparticles, and a refractive index of the plurality of nanoparticles is greater than a refractive index of the selenium-containing heterocyclic polymer.

Optionally, a particle size of each of the plurality of nanoparticles is smaller than 5 nanometers (nm); and/or the plurality of nanoparticles include one or more of titanium dioxide, zirconium dioxide, tantalum pentoxide, and zinc oxide.

Optionally, the waveguide layer serves as a second substrate.

Optionally, the electrowetting display panel further includes the second substrate, the second substrate is disposed on a surface of the waveguide layer away from the first electrode layer, and both the first substrate and the second substrate are flexible substrates.

Optionally, the light exit control layer includes an insulating layer, an oily medium layer, and an aqueous medium layer. The insulating layer is arranged on a surface of the first electrode layer away from the waveguide layer, and the oily medium layer and the aqueous medium layer are arranged between the insulating layer and the second electrode layer.

Optionally, the light exit control layer includes a grating layer, the insulating layer, the oily medium layer, and the aqueous medium layer. The insulating layer is arranged on the surface of the first electrode layer away from the waveguide layer, the grating layer is arranged on the surface of the first electrode away from the insulating layer, and the oily medium layer and the aqueous medium layer are arranged between the insulating layer and the second electrode layer.

The present application further provides an electrowetting display panel including:
the waveguide layer;
the first electrode layer disposed on the side of the waveguide layer;
the light exit control layer disposed on the side of the first electrode layer away from the waveguide layer;
the second electrode layer disposed on the side of the light exit control layer away from the first electrode layer; and
the first substrate disposed on a side of the second electrode layer away from the light exit control layer.

The material of the waveguide layer includes the selenium-containing heterocyclic polymer, the refractive index of the waveguide layer ranges from 1.6 to 2.0, and the transmittance of the waveguide layer is greater than or equal to 90%.

Optionally, the thermal decomposition temperature of the selenium-containing heterocyclic polymer is greater than 250° C.

Optionally, the selenium-containing heterocyclic polymer is the selenium-containing aliphatic heterocyclic 1,3 oxelene alkane polymer.

Optionally, the selenium-containing aliphatic heterocyclic 1,3 oxelene alkane polymer is -continued Optionally, the waveguide layer serves as the second substrate.

Optionally, the electrowetting display panel further includes the second substrate, the second substrate is disposed on the surface of the waveguide layer away from the first electrode layer, and both the first substrate and the second substrate are flexible substrates.

The present application further provides an electrowetting display device including the electrowetting display panel. The electrowetting display panel includes:

the waveguide layer;
the first electrode layer disposed on the side of the waveguide layer;
the light exit control layer disposed on the side of the first electrode layer away from the waveguide layer;
the second electrode layer disposed on the side of the light exit control layer away from the first electrode layer; and
the first substrate disposed on the side of the second electrode layer away from the light exit control layer.

The material of the waveguide layer includes the selenium-containing heterocyclic polymer.

Optionally, the electrowetting display device further includes an edge-type backlight disposed on at least one side of the waveguide layer.

Compared with a conventional electrowetting display panel, the electrowetting display panel provided by the present application, through utilizing the selenium-containing heterocyclic polymer in the waveguide layer and utilizing high refraction properties of the selenium-containing heterocyclic polymer, enhances the refractive index of the waveguide layer, so that the light beams can be stably transmitted in the waveguide layer, which facilitates enhancing an image display effect of electrowetting display products.

DESCRIPTION OF DRAWINGS

In order to describe technical solutions in the present invention clearly, drawings to be used in the description of embodiments will be described briefly below. Obviously, drawings described below are only for some embodiments of the present invention, and other drawings can be obtained by those skilled in the art based on these drawings without creative efforts.

DETAILED DESCRIPTION

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

In addition, it should be understood that specific implementations described here are only used to illustrate and explain the present application and are not used to limit the present application. In the present application, if no explanation is made to the contrary, orientation words such as "upper" and "lower" usually refer to upper and lower directions of a device in an actual use or a working state and specifically refer to drawing directions in drawings. Also, "inner" and "outer" refer to an outline of the device.

The present application provides an electrowetting display panel and an electrowetting display device, and will be respectively described in detail below.

The present application provides an electrowetting display panel. The electrowetting display panel includes a waveguide layer, a first electrode layer, a light exit control layer, a second electrode layer, and a first substrate. The first electrode layer is arranged on a side of the waveguide layer. The light exit control layer is arranged on a first electrode layer away from the waveguide layer. The second electrode layer is arranged on a side of the light exit control layer away from the first electrode layer. The first substrate is arranged on a side of the second electrode layer away from the light exit control layer. A material of the waveguide layer includes a selenium-containing heterocyclic ring polymer.

Therefore, through adopting selenium-containing heterocyclic polymer in the waveguide layer of the electrowetting display panel provided by the present application, and utilizing a high refractive index of the selenium-containing heterocyclic polymer, a refractive index of the waveguide layer is increased, so that light beams can be transmitted stably in the waveguide layer, which facilitates enhancing an image display effect of electrowetting display products.

The electrowetting display panel provided by the present application is described in detail below through specific embodiments. It should be noted that a description order of following embodiments is not intended to limit a preferred order of the embodiments.

Figure 1:
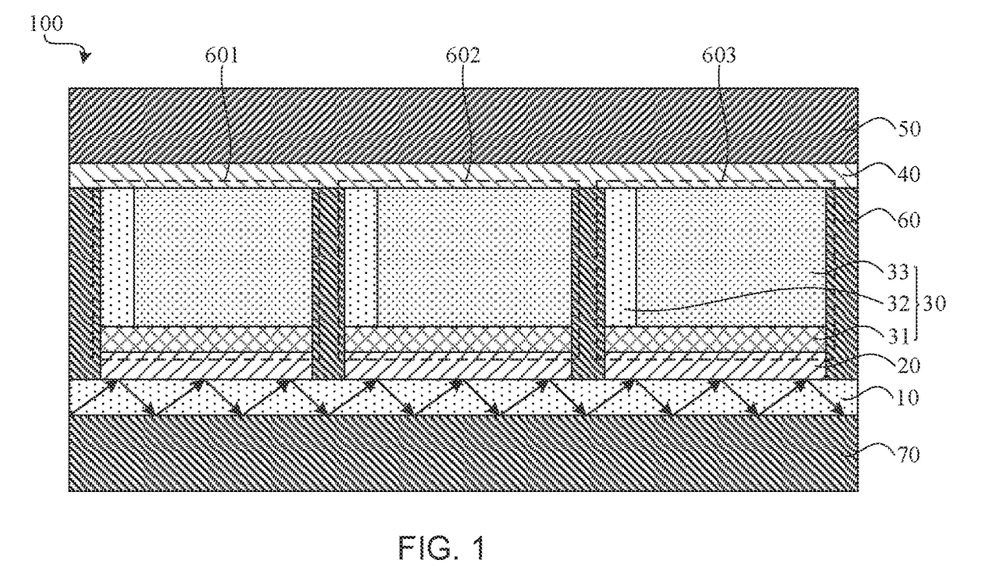
FIG. 1 is a structural schematic view of an electrowetting display panel achieving an L0 grayscale provided by a first embodiment of the present application.
Figure 2:
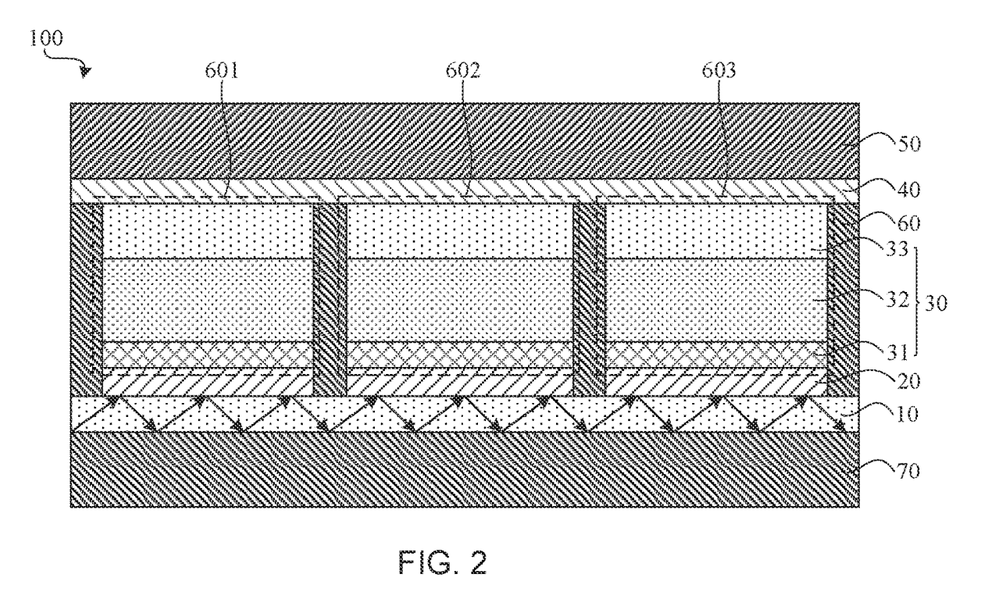
FIG. 2 is a structural schematic view of the electrowetting display panel achieving an L255 grayscale provided by the first embodiment of the present application.

Referring to FIGS. 1-2, a first embodiment of the present application provides an electrowetting display panel 100. The electrowetting display panel 100 includes a waveguide layer 10, a first electrode layer 20, a light exit control layer 30, a second electrode layer 40, and a first substrate 50. The first electrode layer 20 is disposed on a side of the waveguide layer 10. The light exit control layer 30 is disposed on a side of the first electrode layer 20 away from the waveguide layer 10. The second electrode layer 40 is disposed on a side of the light exit control layer 30 away from the first electrode layer 20. The first substrate 50 is disposed on a side of the second electrode layer 40 away from the light exit control layer 30.

The light exit control layer 30 is configured for coupling out a set amount of light from the waveguide layer 10 under a control of the first electrode layer 20 and the second electrode layer 40, and light being coupled out includes light of various wavelengths and directions.

In this embodiment, the light exit control layer 30 includes an insulating layer 31, an oily medium layer 32, and an aqueous medium layer 33. The insulating layer 31 is disposed on a surface of the first electrode layer 20 away from the waveguide layer 10. The oily medium layer 32 and the aqueous medium layer 33 are disposed between the insulating layer 31 and the second electrode layer 40.

The electrowetting display panel 100 further includes a plurality of pixel walls 60 disposed between the waveguide layer 10 and the second substrate 70. The plurality of pixel walls 60 define a plurality of sub-pixels (not labeled in the figures) arranged in an array, and the light exit control layer 30 is disposed in each of the plurality of sub-pixels. The plurality of sub-pixels include a red sub-pixel 601, a green sub-pixel 602, and a blue sub-pixel 603. A material of the oily medium layer 32 in the red sub-pixel 601 is a red oily material, a material of the oily medium layer 32 in the green sub-pixel 602 is a green oily material, and a material of the oily medium layer 32 in the blue sub-pixel 603 is a blue oily material.

Specifically, the red oily material, the green oily material, and the blue oily material are all conductive. For example, the red oily material can be a red conductive ink, and the red conductive ink can be obtained through doping conductive particles in a red ink. The green oily material can be a green conductive ink, and the green conductive ink can be obtained through doping conductive particles in a green ink. The blue oily material can be a blue conductive ink, and the blue conductive ink can be obtained through doping conductive particles in a blue ink. A material of the aqueous medium layer 33 is water or other transparent medium with an insulating property. For example, the insulating layer 31 can be a hydrophobic insulating layer.

The first electrode layer 20 and the second electrode layer 40 are used to apply a voltage to the oily medium layer 32 and the aqueous medium layer 33 to change a contact angle of the oily medium layer 32, so that the oily medium layer 32 or the aqueous medium layer 33 cover the waveguide layer 10 to various extents, and the set amount of light is coupled out from the waveguide layer 10, thereby achieving a grayscale display.

In this embodiment, a refractive index of the first electrode layer 20 and a refractive index of the second electrode layer 40 are both smaller than a refractive index of the waveguide layer 10. The first electrode layer 20 can be a block electrode, and the second electrode layer 40 can be a whole surface electrode. Specifically, a material of the first electrode layer 20 and a material of the second electrode layer 40 are both transparent conductive materials, such as indium tin oxide, indium zinc oxide, magnesium fluoride, or silver.

Taking the insulating layer 31 as a hydrophobic insulating layer as an example, FIG. 1 and FIG. 2 are respectively structural schematic views of the electrowetting display panel 100 of this embodiment for achieving an L0 grayscale and an L255 grayscale.

As shown in FIG. 1, when the voltage is applied to the oily medium layer 32 through the first electrode layer 20 and the second electrode layer 40 (V=V$_{max}$), the voltage being applied changes a contact angle between conductive inks in the oily medium layer 32 and the insulating layer 31 which causes the oily medium layer 32 to shift to a side. At this time, the waveguide layer 10 is covered by the aqueous medium layer 33. Since a refractive index of the aqueous medium layer 33 is relatively small, light cannot be coupled out from the waveguide layer 10. Therefore, at this time, the electrowetting display panel 100 is in an L0 state, i.e., a lowest gray level state, and the electrowetting display panel 100 is in a dark state or a continuously black mode.

As shown in FIG. 2, when the first electrode layer 20 and the second electrode layer 40 do not apply the voltage to the oily medium layer 32 (V=0), since there is a repulsive effect between the aqueous medium layer 33 and the insulating layer 31, the aqueous medium layer 33 is shifted above the oily medium layer 32, so that the oily medium layer 32 covers the waveguide layer 10. Since a refractive index of the oily medium layer 32 is relatively large, an amount of light coupled out from the waveguide layer 10 is the greatest. At this time, the electrowetting display panel 100 is in an L255 state, i.e., a highest gray level state, the electrowetting display panel 100 is in a bright state or a continuously white mode. The red sub-pixel 601 displays red, the green sub-pixel 602 displays green, and the blue sub-pixel 603 displays blue.

Furthermore, when the voltage applied to the first electrode layer 20 and the second electrode layer 40 is between 0 and V$_{max}$, a position of the oily medium layer 32 is located between above-mentioned two cases. That is to say, difference in the applied voltage causes the oily medium layer 32 or the aqueous medium layer 33 to cover the waveguide layer 10 to different extents, making the amount of light coupled out from the waveguide layer 10 different, so that different sub-pixels display different colors and grayscales, thereby achieving a full-color display.

In this embodiment, a material of the waveguide layer 10 includes the selenium-containing heterocyclic polymer. In this embodiment, the selenium-containing heterocyclic polymer is used in the waveguide layer 10, and the high refractive index of the selenium-containing heterocyclic polymer is utilized to enhance the refractive index of the waveguide layer 10, so that the light beams can be stably transmitted in the waveguide layer 10, which facilitates enhancing the image display effect of the electrowetting display products. In a case of using the selenium-containing heterocyclic polymer, the refractive index of the waveguide layer 10 can range from 1.6 to 2.0.

In this embodiment, the material of the waveguide layer 10 is the selenium-containing heterocyclic polymer. Here, the refractive index of the selenium-containing heterocyclic polymer ranges from 1.6 to 2.0. In some specific embodiments, the refractive index of the selenium-containing heterocyclic polymer can be 1.6, 1.65, 1.7, 1.75, 1.8, 1.85, 1.9, or 2.0.

Specifically, the selenium-containing heterocyclic polymer is a selenium-containing aliphatic heterocyclic 1,3 oxelene alkane polymer. In some specific embodiments, the selenium-containing aliphatic heterocyclic 1,3 oxelene alkane polymer is In this embodiment, the selenium-containing aliphatic heterocyclic 1,3 oxelene alkane polymer is Due to having a high refractive index, specifically, under an irradiation of light with a wavelength of 567 nanometer (nm), a refractive index of is 1.82, and under an irradiation of light with a wavelength of 633 nm, the refractive index of can reach to 1.93. By using above-mentioned materials, the refractive index of the waveguide layer 10 can be significantly increased, so as to further facilitate enhancing a stable transmission of the light beams in the waveguide layer 10.

A transmittance of the waveguide layer 10 is greater than or equal to 90%. Therefore, by using the selenium-containing heterocyclic polymer as a waveguide material, the waveguide layer 10 obtained in this embodiment has a higher transmittance to light, so as to facilitate achieving a transparent display of the electrowetting display products.

Furthermore, in this embodiment, the selenium-containing heterocyclic polymer also has the following properties:

1. Good flexibility: a use of the selenium-containing heterocyclic polymer greatly enhances a flexibility of the waveguide layer 10, which facilitates achieving a flexible electrowetting display.
2. Good thermal stability: Since a thermal decomposition temperature of the selenium-containing heterocyclic polymer is greater than 250° C., the waveguide layer 10 is enhanced with an excellent thermal stability. Therefore, in a manufacturing process of the electrowetting display panel 1000, a high temperature resistance of the waveguide layer 10 can be utilized to enhance film performances in subsequent manufacturing processes. In addition, better thermal stability can also increase a service life of the electrowetting display products.
3. Good chemical stability: Since the selenium-containing heterocyclic polymer provides good stability in chemical environments such as organic acids, organic bases, dilute hydrochloric acid, dilute sulfuric acid, etc., the electrowetting display panel 100 in this embodiment can withstand harsh chemical environments.
4. Good processability: Since the selenium-containing heterocyclic polymer is an organic compound and has good solubility in organic solvents such as tetrahydrofuran, dichloromethane, chloroform, N,N-dimethylformamide, or dimethyl sulfoxide. Therefore, films can be formed through simple coating processes such as spin coating, spray coating, or blade coating, so as to simplify film forming processes of the waveguide layer 10 and reduce a process cost.

In this embodiment, a refractive index of the first substrate 50 is smaller than the refractive index of the waveguide layer 10. The first substrate 50 serves as a carrier substrate for the second electrode layer 40. Furthermore, the electrowetting display panel 100 further includes the second substrate 70, and the second substrate 70 is disposed on a surface of the waveguide layer 10 away from the first electrode layer 20.

The first substrate 50 and the second substrate 70 are both flexible substrates. By using a flexible substrate, a flexibility of the electrowetting display panel 100 can be enhanced, thereby achieving the flexible electrowetting display. In some specific embodiments, a material of the flexible substrate can be polyimide, polydimethylsiloxane, polymethylmethacrylate, or polyethylene terephthalate.

Figure 3:
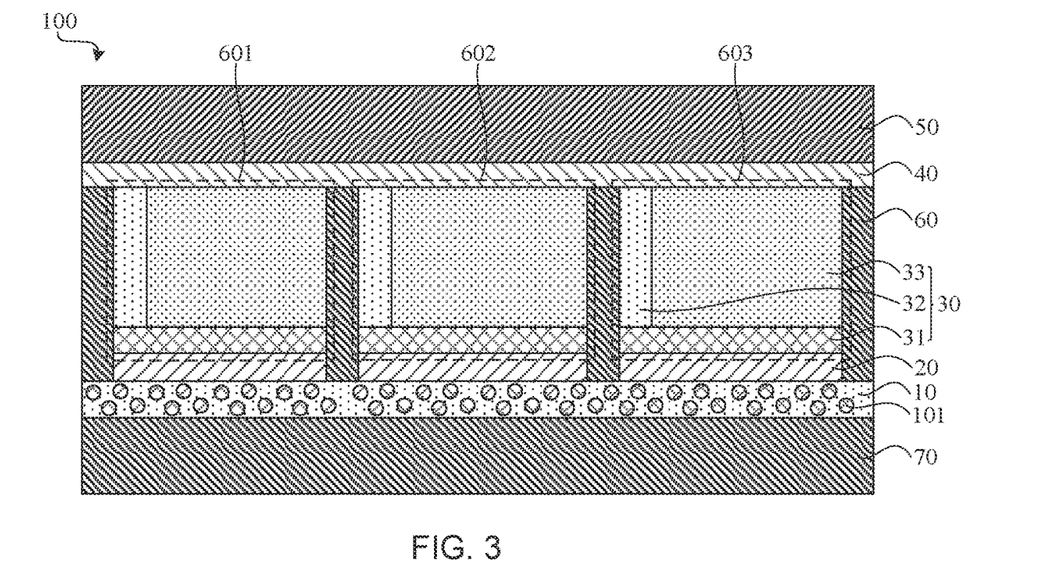
FIG. 3 is a structural schematic view of an electrowetting display panel achieving an L0 grayscale provided by a second embodiment of the present application.
Figure 4:
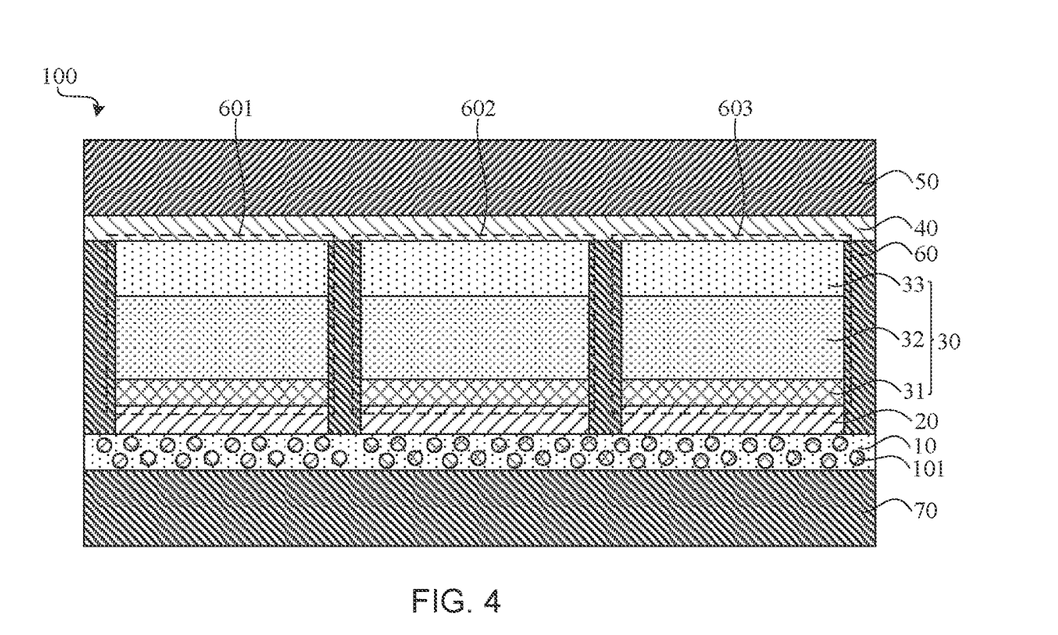
FIG. 4 is a structural schematic view of the electrowetting display panel achieving an L255 grayscale provided by the second embodiment of the present application.

Referring to FIG. 3 and FIG. 4, a second embodiment of the present application provides an electrowetting display panel 100. Differences between the electrowetting display panel 100 provided by the second embodiment and the first embodiment of the present application are that the material of the waveguide layer 10 further includes a plurality of nanoparticles 101, and a refractive index of the plurality of nanoparticles 101 is greater than the refractive index of the selenium-containing heterocyclic polymer.

In this embodiment, through adding the plurality of nanoparticles 101 having the refractive index greater than the refractive index of the selenium-containing heterocyclic polymer to the waveguide layer 10, and through a composite of the selenium heterocyclic polymer and the plurality of nanoparticles 101, the refractive index of the waveguide layer 10 can be further increased, thereby further increasing a stable transmission of light in the waveguide layer 10.

In this embodiment, a particle size of the plurality of nanoparticles 101 is less than 5 nm to ensure high refraction properties. In addition, a mass content of the plurality of nanoparticles 101 in the waveguide layer 10 can be less than 50 weight percent (wt %), and this setting can ensure that the flexibility of the waveguide layer 10 is not affected.

It should be noted that, in this embodiment, the plurality of nanoparticles 101 are non-conductive, so as to prevent a conduction between the waveguide layer 10 and the first electrode layer 20 which affects a conductivity of the first electrode layer 20.

Specifically, the plurality of nanoparticles 101 can include one or more of titanium dioxide, zirconium dioxide, tantalum pentoxide, and zinc oxide. By using above-mentioned materials, the flexibility of the waveguide layer 10 can be enhanced while the refractive index of the waveguide layer 10 is increased, so that the stable transmission of the light beams in the waveguide layer 10 can be enhanced, and the flexibility of the electrowetting display panel 100 can also be enhanced.

It should be noted that, for a display principle of the electrowetting display panel 100 in this embodiment, reference can be made to the description of the afore-mentioned first embodiment, which will not be reiterated herein.

Figure 5:
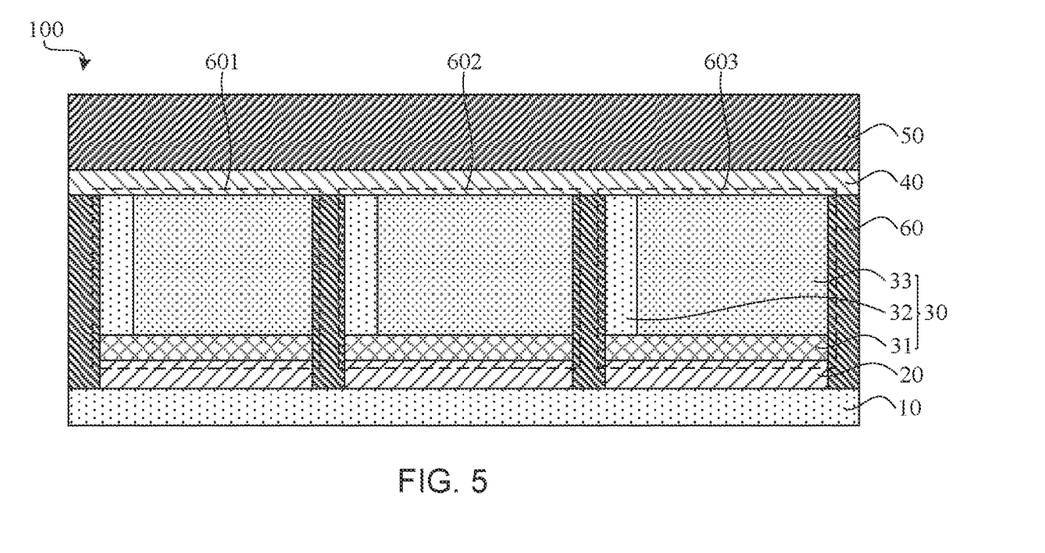
FIG. 5 is a structural schematic view of an electrowetting display panel achieving an L0 grayscale provided by a third embodiment of the present application.
Figure 6:
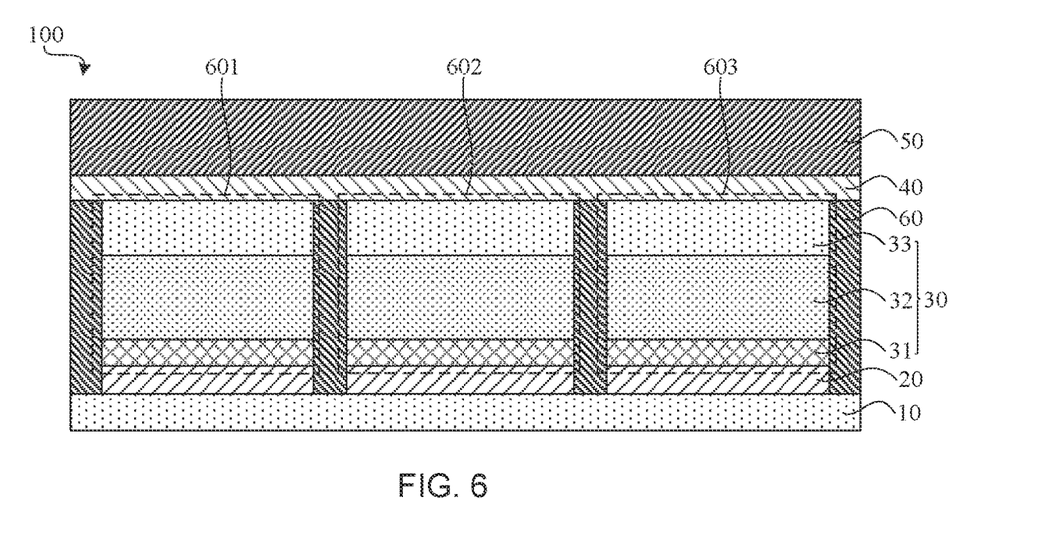
FIG. 6 is a structural schematic view of the electrowetting display panel achieving an L255 grayscale provided by the third embodiment of the present application.

Referring to FIGS. 5-6, a third embodiment of the present application provides an electrowetting display panel 100. Differences between the electrowetting display panel 100 provided by the third embodiment and the first embodiment of the present application is that the waveguide layer 10 serves as the second substrate and serves as a carrier substrate for the first electrode layer 20.

Since the selenium-containing heterocyclic polymer has a rigid conjugated structure, the selenium-containing heterocyclic polymer has good flexibility and good rigidity. Therefore, when the selenium-containing heterocyclic polymer is used as the material of the waveguide layer 10, the waveguide layer 10 has good rigidity. Therefore, by having the waveguide layer 10 serve as the second substrate in this embodiment, the original second substrate can be omitted. Therefore, a thickness of the electrowetting display panel 100 is reduced, which facilitates achieving a thin and light design of the electrowetting display products. In addition, as a polymer, the selenium-containing heterocyclic polymer has good connection stability among monomers thereof and is not easy to break, so that the waveguide layer 10 has good fracture resilience, so as to ensure a fracture resilience of the waveguide layer 10 to ensure feasibility of replacing the second substrate.

It should be noted that, for a display principle of the electrowetting display panel 100 in this embodiment, reference can be made to the description of the afore-mentioned first embodiment, which will not be reiterated herein.

Figure 7:
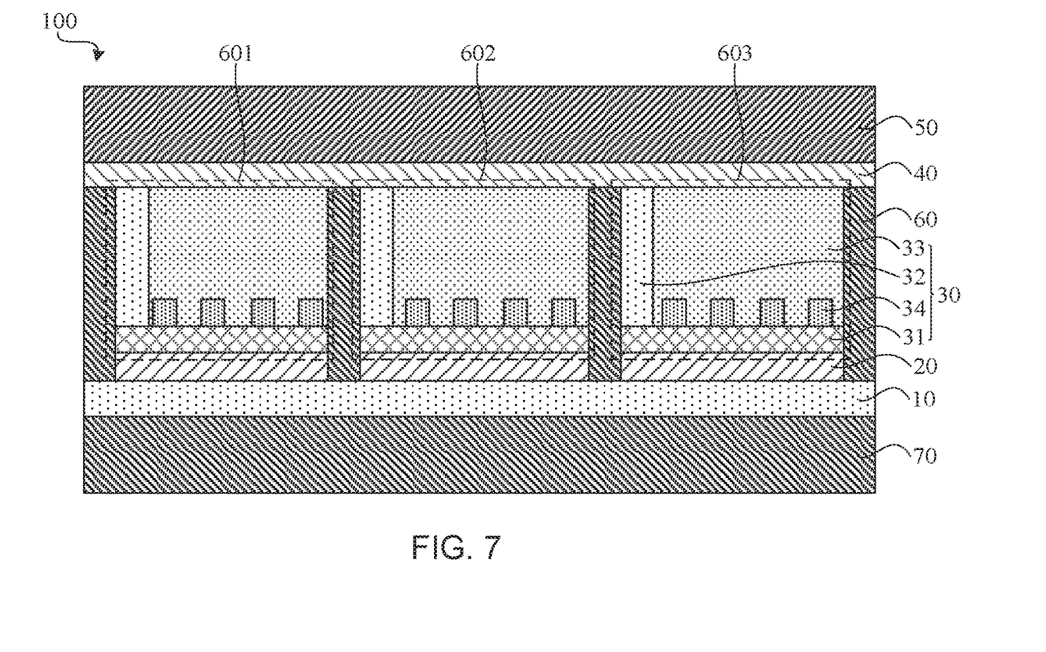
FIG. 7 is a structural schematic view of an electrowetting display panel achieving an L0 grayscale provided by a fourth embodiment of the present application.
Figure 8:
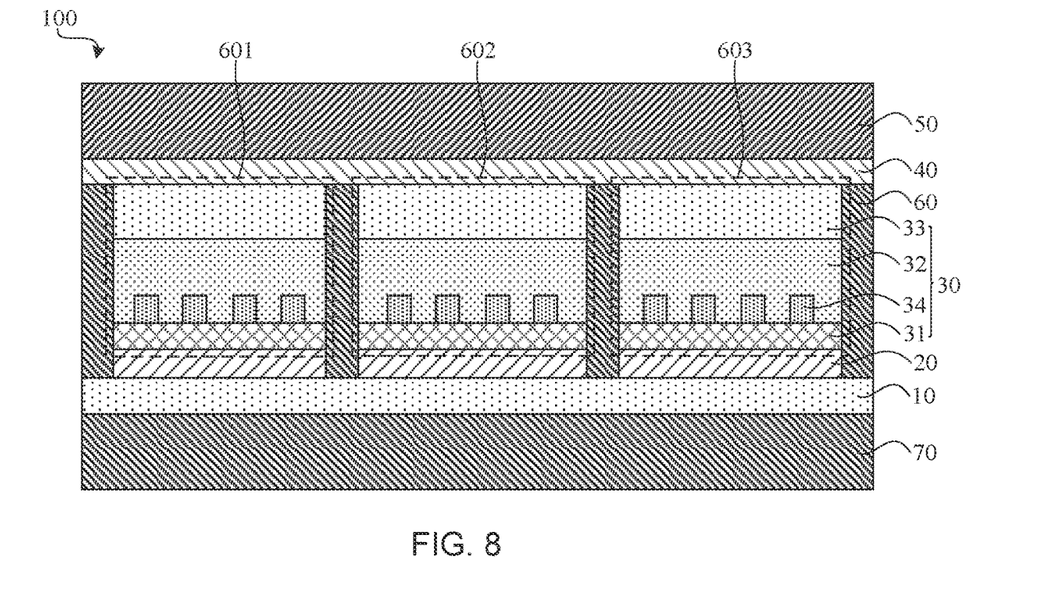
FIG. 8 is a structural schematic view of the electrowetting display panel achieving an L255 grayscale provided by the fourth embodiment of the present application.

Referring to FIGS. 7-8, a fourth embodiment of the present application provides an electrowetting display panel 100. Differences between the electrowetting display panel 100 provided by the fourth embodiment and the first embodiment of the present application are that the light exit control layer 30 further includes a grating layer 34, and the grating layer 34 is disposed on a surface of the insulating layer 31 away from the first electrode layer 20.

A refractive index of the grating layer 34 is same as or similar to the refractive index of the aqueous medium layer 33.

In this embodiment, when the first electrode layer 20 and the second electrode layer 40 apply the voltage to the oily medium layer 32, the contact angle of the oily medium layer 32 can be changed, so that the oily medium layer 32 and the aqueous medium layer 33 cover the grating layer 34 to different extents, so that the grating layer 34 couples out a set amount of light from the waveguide layer 10, so as to achieve the grayscale display.

Taking the insulating layer 31 as a hydrophobic insulating layer as an example, FIG. 7 and FIG. 8 are respectively structural schematic views of the electrowetting display panel 100 of this embodiment for achieving the L0 grayscale and the L255 grayscale.

As shown in FIG. 7, when the voltage is applied to the oily medium layer 32 through the first electrode layer 20 and the second electrode layer 40 ($V=V_{max}$), the voltage being applied changes the contact angle between the conductive inks in the oily medium layer 32 and the insulating layer 31 which causes the oily medium layer 32 to shift to the side. At this time, the grating layer 34 is covered by the aqueous medium layer 33. Since the refractive index of the grating layer 34 and the refractive index of the aqueous medium layer 33 are similar, the grating layer 34 and the aqueous medium layer 33 are viewed as a whole, which makes a grating effect of the grating layer 34 to be fully covered, so that light cannot be coupled out from the waveguide layer 10. Therefore, at this time, the electrowetting display panel 100 is in the L0 state, i.e., the lowest gray level state, and the electrowetting display panel 100 is in the dark state or the continuously black mode.

As shown in FIG. 8, when the first electrode layer 20 and the second electrode layer 40 do not apply the voltage to the oily medium layer 32 ($V=0$), since there is the repulsive effect between the aqueous medium layer 33 and the insulating layer 31, the aqueous medium layer 33 is shifted above the oily medium layer 32, so that the oily medium layer 32 covers the grating layer 34. Since the refractive index of the oily medium layer 32 is way greater than the refractive index of the grating layer 34, the grating effect is at most significance, and the amount of light coupled out from the waveguide layer 10 is the greatest. At this time, the electrowetting display panel 100 is in the L255 state, i.e., the highest gray level state, the electrowetting display panel 100 is in the bright state or the continuously white mode. The red sub-pixel 601 displays red, the green sub-pixel 602 displays green, and the blue sub-pixel 603 displays blue.

Furthermore, when the voltage applied to the first electrode layer 20 and the second electrode layer 40 is between 0 and $V_{max}$, the position of the oily medium layer 32 is located between the above-mentioned two cases. That is to say, the difference in the applied voltage causes the oily medium layer 32 or the aqueous medium layer 33 to cover the grating layer 34 to different extents, making the amount of light coupled out from the waveguide layer 10 different, so that different sub-pixels display different colors and grayscales, thereby achieving the full-color display.

Figure 9:
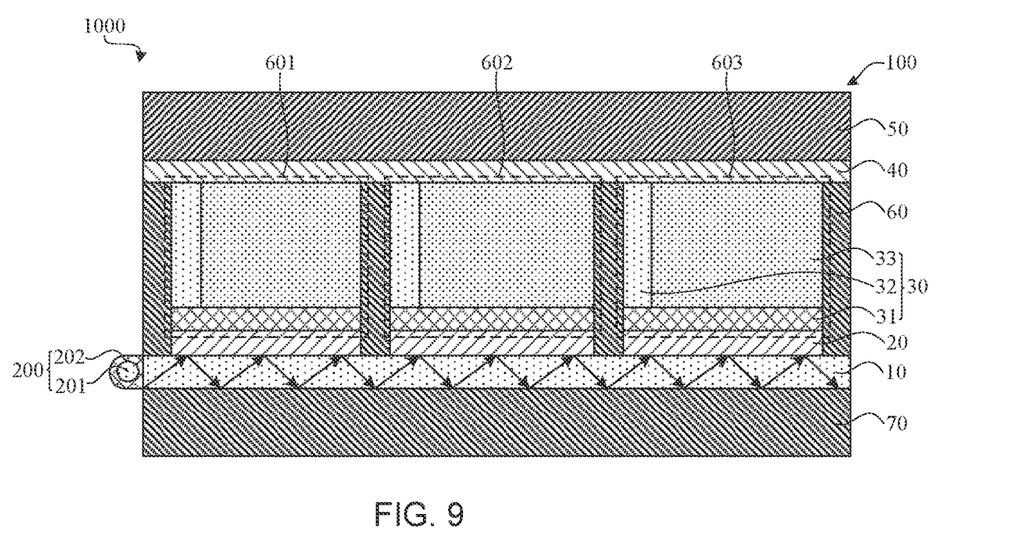
FIG. 9 is a structural schematic view of an electrowetting display device provided by a first example of the present application.

Referring to FIG. 9, a first example of the present application provides an electrowetting display device 1000. The electrowetting display device 1000 includes an electrowetting display panel 100 and an edge-type backlight 200. The edge-type backlight 200 is disposed on a side of the waveguide layer 10.

It should be noted that the electrowetting display panel 100 in this embodiment can be the electrowetting display panel 100 described in any of the afore-mentioned embodiments, and a structure of the electrowetting display panel 100 in the afore-mentioned first embodiment is only used as an example for describing in this embodiment, but not limited thereto.

In this embodiment, the edge-type backlight 200 is disposed on a side of the electrowetting display panel 100, and the edge-type backlight 200 is utilized to provide light entering the waveguide layer 10. Therefore, compared to an arrangement using ambient light to provide the light entering the waveguide layer 10, this embodiment can improve a brightness of the electrowetting display device 1000, thereby improving a display quality of the electrowetting display device 1000.

Specifically, the edge-type backlight 200 can include a backlight source 201 and a reflector 202 disposed on the backlight source 201. The backlight source 201 can be a light-emitting diode, and the light-emitting diode can be an organic light-emitting diode. The reflector 202 has a reflecting effect on light emitted by the backlight source 201, which can improve a light utilization rate of the backlight source 201, thereby further improving the brightness of the electrowetting display device 1000.

It should be noted that this embodiment only shows a structural schematic view of the electrowetting display device 1000 for achieving the L0 grayscale. A principle of the electrowetting display device 1000 achieving the L255 grayscale is same as a principle of the electrowetting display panel 100 in the afore-mentioned embodiments, and specific principles and structures can be referred to the description of the first embodiment, and will not be reiterated herein.

Figure 10:
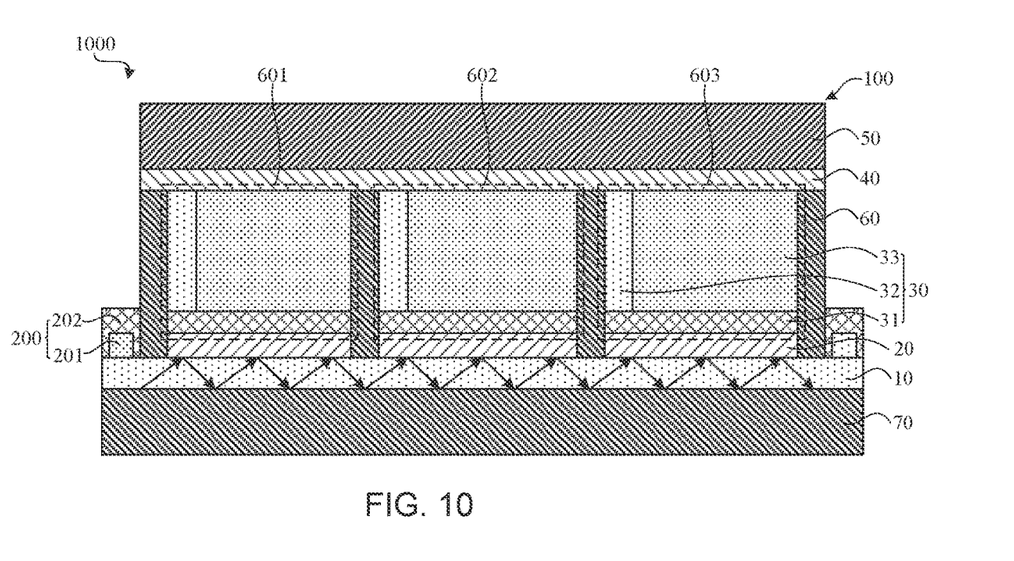
FIG. 10 is a structural schematic view of an electrowetting display device provided by a second example of the present application.

Referring to FIG. 10, a second example of the present application provides an electrowetting display device 1000. A difference between the electrowetting display device 1000 provided in the second example and the first example of the present application is that the edge-type backlight 200 are arranged around a peripheral side of the waveguide layer 10.

In this embodiment, by arranging the edge-type backlight 200 around the peripheral side of the waveguide layer 10, the brightness of the electrowetting display device 1000 can be further enhanced, so that the display quality of the electrowetting display device 1000 can be further enhanced.

The electrowetting display panel and the electrowetting display device provided by the present application are described in detail above, the specific examples of this document are used to explain principles and embodiments of the present application, and the description of embodiments above is only for helping to understand the present application. Meanwhile, those skilled in the art will be able to change the specific embodiments and the scope of the present application according to the idea of the present application. In the above, the content of the specification should not be construed as limiting the present application. Above all, the content of the specification should not be the limitation of the present application.

What is claimed is:

1. An electrowetting display panel, comprising:
   a waveguide layer;
   a first electrode layer disposed on a side of the waveguide layer;
   a light exit control layer disposed on a side of the first electrode layer away from the waveguide layer;
   a second electrode layer disposed on a side of the light exit control layer away from the first electrode layer; and
   a first substrate disposed on a side of the second electrode layer away from the light exit control layer;
   wherein a material of the waveguide layer comprises a selenium-containing heterocyclic polymer, and wherein the selenium-containing heterocyclic polymer is a selenium-containing aliphatic heterocyclic 1,3 oxelene alkane polymer having a refractive index ranging from 1.6 to 2.0.

2. The electrowetting display panel according to claim 1, wherein a transmittance of the waveguide layer is greater than or equal to 90%.

3. The electrowetting display panel according to claim 1, wherein a thermal decomposition temperature of the selenium-containing heterocyclic polymer is greater than 250° C.

4. The electrowetting display panel according to claim 1, wherein the selenium-containing aliphatic heterocyclic 1,3 oxelene alkane polymer is 5. The electrowetting display panel according to claim 1, wherein the material of the waveguide layer further comprises a plurality of nanoparticles, and a refractive index of the plurality of nanoparticles is greater than a refractive index of the selenium-containing heterocyclic polymer.

6. The electrowetting display panel according to claim 5, wherein a particle size of each of the plurality of nanoparticles is smaller than 5 nanometers (nm); or
the plurality of nanoparticles comprise one or more of titanium dioxide, zirconium dioxide, tantalum pentoxide, and zinc oxide.

7. The electrowetting display panel according to claim 1, wherein the waveguide layer serves as a second substrate.

8. The electrowetting display panel according to claim 1, wherein the electrowetting display panel further comprises a second substrate, the second substrate is disposed on a surface of the waveguide layer away from the first electrode layer, and both the first substrate and the second substrate are flexible substrates.

9. The electrowetting display panel according to claim 1, wherein the light exit control layer includes an insulating layer, an oily medium layer, and an aqueous medium layer, the insulating layer is arranged on a surface of the first electrode layer away from the waveguide layer, and the oily medium layer and the aqueous medium layer are arranged between the insulating layer and the second electrode layer.

10. The electrowetting display panel according to claim 1, wherein the light exit control layer includes a grating layer, an insulating layer, an oily medium layer, and an aqueous medium layer, the insulating layer is arranged on a surface of the first electrode layer away from the waveguide layer, the grating layer is arranged on a surface of the first electrode away from the insulating layer, and the oily medium layer and the aqueous medium layer are arranged between the insulating layer and the second electrode layer.

11. An electrowetting display panel, comprising:
a waveguide layer;
a first electrode layer disposed on a side of the waveguide layer;
a light exit control layer disposed on a side of the first electrode layer away from the waveguide layer;
a second electrode layer disposed on a side of the light exit control layer away from the first electrode layer; and
a first substrate disposed on a side of the second electrode layer away from the light exit control layer;
wherein a material of the waveguide layer comprises a selenium-containing heterocyclic polymer, wherein the selenium-containing heterocyclic polymer is a selenium-containing aliphatic heterocyclic 1,3 oxelene alkane polymer having a refractive index ranging from 1.6 to 2.0, a refractive index of the waveguide layer ranges from 1.6 to 2.0, and a transmittance of the waveguide layer is greater than or equal to 90%.

12. The electrowetting display panel according to claim 11, wherein a thermal decomposition temperature of the selenium-containing heterocyclic polymer is greater than 250° C.

13. The electrowetting display panel according to claim 11, wherein the selenium-containing aliphatic heterocyclic 1,3 oxelene alkane polymer is 14. The electrowetting display panel according to claim 11, wherein the waveguide layer serves as a second substrate.

15. The electrowetting display panel according to claim 11, wherein the electrowetting display panel further comprises a second substrate, the second substrate is disposed on a surface of the waveguide layer away from the first electrode layer, and both the first substrate and the second substrate are flexible substrates.

16. An electrowetting display device comprising the electrowetting display panel as claimed in claim 1.

17. The electrowetting display device according to claim 16, wherein the electrowetting display device further comprises an edge-type backlight disposed on at least one side of the waveguide layer.

18. An electrowetting display panel, comprising:
a waveguide layer;
a first electrode layer disposed on a side of the waveguide layer;
a light exit control layer disposed on a side of the first electrode layer away from the waveguide layer;
a second electrode layer disposed on a side of the light exit control layer away from the first electrode layer; and
a first substrate disposed on a side of the second electrode layer away from the light exit control layer;
wherein a material of the waveguide layer comprises a selenium-containing heterocyclic polymer, and wherein the material of the waveguide layer further comprises a plurality of nanoparticles, and a refractive index of the plurality of nanoparticles is greater than a refractive index of the selenium-containing heterocyclic polymer.

19. The electrowetting display panel according to claim 18, wherein a refractive index of the waveguide layer ranges from 1.6 to 2.0.

* * * * *